United States Patent [19]

Wilen

[11] Patent Number: 4,850,124
[45] Date of Patent: Jul. 25, 1989

[54] TV PROGRAM ORGANIZER

[76] Inventor: Richard Wilen, 8 Roxbury Ct., Oakdale, N.Y. 11769

[21] Appl. No.: 161,047

[22] Filed: Feb. 26, 1988

[51] Int. Cl.⁴ .............................................. G09D 3/02
[52] U.S. Cl. ........................................ 40/122; 40/405
[58] Field of Search ...................... 40/122, 124.2, 405, 40/390, 391, 533, 534, 537; 150/147

[56] References Cited

U.S. PATENT DOCUMENTS

| 1,362,961 | 12/1920 | Rand | 40/405 |
| 1,760,069 | 5/1930 | Kennedy | 40/122 |
| 4,085,535 | 4/1978 | Schweinsberg | 40/124.2 |
| 4,226,039 | 10/1980 | Young | 40/405 |

FOREIGN PATENT DOCUMENTS 465596  5/1937  United Kingdom .............. 40/124.2

Primary Examiner—Robert P. Swiatek
Assistant Examiner—Cary E. Stone
Attorney, Agent, or Firm—Stephen E. Feldman

[57] ABSTRACT

A plurality of sheets each being substantially the same width and length are combined in a face-to-face relationship, with common first ends of adjacent sheets offset from each other a predetermined distance. The combined sheets are folded on a common fold such that one of the sheets is folded over itself with its opposite ends offset from each other the same predetermined distance. This forms a plurality of equidistance, spaced pockets across the face of the folded sheets constituting an organizer for storing cards and/or stamps. Provision is made, in the form of adhesive stripes to limit the depth of the lateral pockets and to hold the sheets of the organizer together.

7 Claims, 1 Drawing Sheet

U.S. Patent        Jul. 25, 1989        4,850,124
FIG. 1
FIG. 2
FIG. 3
FIG. 4
FIG. 5
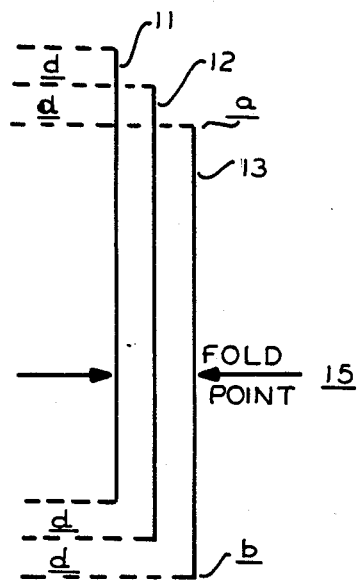
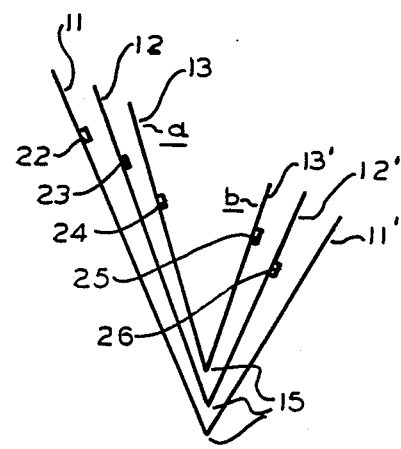
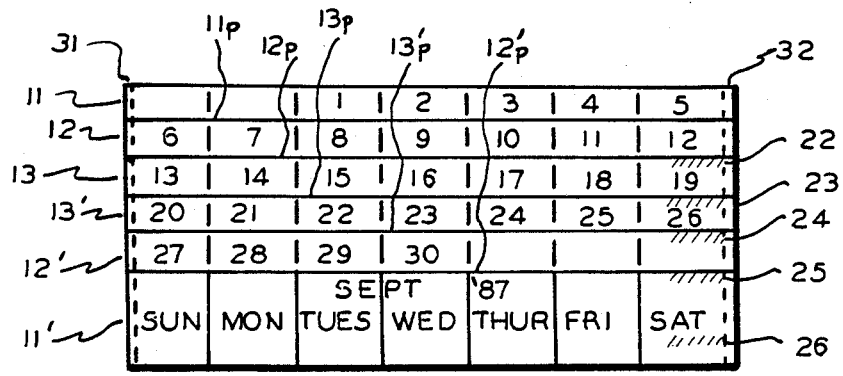
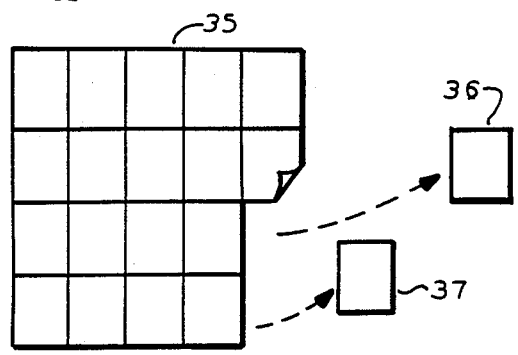
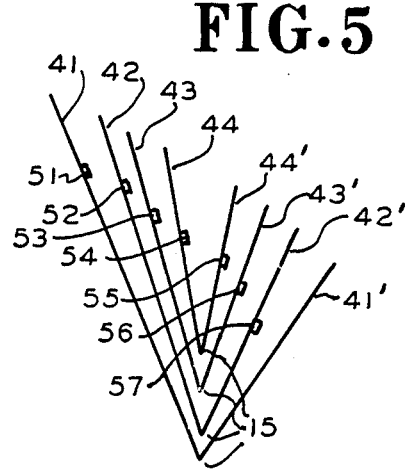

TV PROGRAM ORGANIZER

BACKGROUND OF THE INVENTION

The present invention relates to programmable organizers. In particular the present invention relates to inexpensive, disposable programmable organizers particularly useful for programming a personalized television (TV) program or TV programs schedule.

Prior to the days of television, radio was a popular home family entertainment. Radio programs, that is, the listing of radio presentations to be broadcast over the air during a period of time, for example, for a particular days were normally provided in the local news paper. In areas, such a metropolitan areas, for example, where daily newspapers were published and sold, the radio program for that particular day was printed in the daily paper, the programs based on time. In the days of radio and in the days of early TV, programs were relatively simple. Presentations broadcast were, for the most part, presented live over the air and presentations were not often repeated. In addition, the number of broadcast stations, both radio and /or TV was relatively few in any given area and both the radio and the TV programs were relatively simple, there being two daily programs, one program for radio and one program for TV. With relatively few radio stations and/or television broadcast stations or channels receivable in a given area, such as the New York Metropolitan area, for example radio and TV programs, which were set forth on the basis of time were easily readable.

With the advent of cable television, the number of TV channels receivable over television sets connected to the cable system was greatly increased. The use of satellites for transmitting TV presentations further increased the number of channels receivable in anyone place or area. As the number of TV channels receivable by television sets increased and TV technology expanded, pre-taping or pre-recording of TV presentations or shows became more the practice than the exception. Further, with more TV channels available for viewing and TV being broadcast around the clock, a large effort was made to broadcast motion pictures over TV. In order to make motion pictures available to more people, movies, and other popular TV presentations were often broadcast or aired several times during the same day and on different days of the week, some times by several different channels. This factor alone made TV programs based on time difficult to publish and difficult to read because of the repetition of TV presentations involved.

In order to simplify TV programs and make the programs more readable, the basis on which TV programs was set forth, that is, the basis of time was changed and TV programs based on titles or the identification of the TV presentation were set forth. This system produced a long list, in alphabetical order, of TV presentations to be broadcast over a specific period of time, for example, a month, with the dates, times and channels over which the particular presentation was to be aired listed after the name of the presentation.

An example of part of a listing may be as follows:

| Column 1 | Column 2 |
| --- | --- |
| SAM DOE | CHANNEL 10 |
| COMEDY | MON. JUNE 9 8:30 PM |
| SHOW | WED. JUNE 18 10 PM |
| | CHANNEL 14 |
| | FRI. JUNE 6 8 PM/11:30 PM |
| | MON. JUNE 9 11:30 PM |
| SANDY'S DOG | CHANNEL 22 |
| | MON. JUNE 9 9:30 AM/3 PM |
| | WED. JUNE 26 10 AM/2:30 PM |

As can be seen, the basis of the program is the name of the presentation followed by the channel presenting the particular show and the days and times of airing.

It has been suggested that programs, based on presentation or show names be presented to the public as cut-out or tear-out stamps. Each stamp identifies a TV show or presentation on one side and on the other side the schedule of airing is set forth. An organizer may be set up on a time basis, for example, a month and pockets in the organizer may be made to receive the stamps according to one's choice for his schedule of TV viewing. My co-pending patent application entitled Programming Device, filed July 27, 1987 and assigned Ser. No. 78,119 teaches the use of such TV presentation identifying stamps and the use of a TV programmer which is in the form of a calender, in mirror image, with a transparent flip sheet in the form of a rack or organizer for storing cards or stamps having data thereon relating to the name or title of a TV presentation on one side of the card or stamp and the schedule of airing and the channel on which the presentation is to be aired on the other side of the card or stamp.

Although the self programming TV programmer of my said co-pending application is useful and practical, the cost of materials for the programmer and the cost of assembly combine to make the total cost too expensive for a disposable, give-away programmer. In addition, the structure of the programmer is not of a disposable nature.

SUMMARY OF THE INVENTION

The present invention provides a programmer or organizer that is made from very inexpensive materials, is made very simply and inexpensively and is disposable. The organizer is assembled from a plurality, preferably three (3) sheet, which are of the same width and length. The sheets are oriented in offset alignment and folded at a common point. The sheets are glued with stripes of glue or other adhesive layed down across the sheets and the sheets are assembled thereby forming plurality of laterial, parallel pockets for holding cards and/or stamps containing data thereon. The material from which the organizer is made may be stock paper, such as 25 lb directory stock and the adhesive may be an inexpensive adhesive or glue. The organizer may be assembled from paper cut into sheets from a roll supply of paper and oriented into an offset alignment. The oriented sheets are folded and secured together into the organizer. They may be assembled using a sheet paper supply wherein the supply includes a stack of cut paper sheets, each sheet being substantially identical. Sheets may be separated from the stack one at a time in a group of four sheets and oriented in offset alignment. The sheets may then be folded and secured by stripes of adhesive.

These inexpensive organizers may be assembled in blank or may be pre-printed. The cost of materials and cost of assembly are very small and combine to make an inexpensive, disposable give-away organizer,

BRIEF DESCRIPTION OF THE DRAWINGS

FIG. 1 is a representation of the components of the invention in offset orientation, prior to folding;

FIG. 2 is a representation of the components of FIG. 1 in folded configuration, in exploded view;

FIG. 3 is a representation of the assembled TV program organizer;

FIG. 4 represents a sheet of TV program stamps with two stamps removed from the sheet; and FIG. 5 represents an alternate arrangement of the invention, in exploded view.

DETAILED DESCRIPTION OF THE INVENTION

FIG. 1, represents the components of the present invention, in offset orientation and exploded from each other. The elements include sheets 11, 12 and 13 which are essentially uniform in contour and size. Preferably, paper or like material is employed.

The sheets are offset, one from the other a distance d such that the offset spacing between sheet ends is the same at the top and the bottom of the oriented position of the sheets.

The sheets are folded at the fold point 15, the fold point being determined by the ultimate folded position of the sheet 13, for example, where, when folded, the ends a and b of sheet 13 will be offset from each other a distance d. This folding will provide five (5) spaces or slots between adjacent sheet such as represented in FIG. 2, the fold point 15 is exploded which effectively repositions the sheet ends with respect to each other.

In the folded position of the sheet pockets or slots 11p, 12p, 13p, 12'p, and 13'p, are formed between adjacent sheets such as 11/12; 12/13; 13/13'; 13'/12'; and 12'/11' making a total of five (5) pockets. These pockets have a common bottom, the fold point 15.

In the preferred arrangement, the pocket depths are limited by applying or laying down a stripe of adhesive across the one of the internal faces of the sheets forming one pocket. Adhesive stripes on internal faces of sheets of the pockets formed are represented at 22 through 26 in FIG. 2 and are represented in FIG. 3 by shaded lines shown particularly across the face of the drawing.

The broken lines 31 and 32, at the edges of the organizer, represent adhesive stripes, or adhesive bands, such as a plastic adhesive tape, such as SCOTCH brand mending tape or 3M brand mending tape, for example which secure the edges of the organizer.

If the adhesive stripes layed down on each sheet are located a distance 2d from the closest end of the sheet, each pocket will have a pocket depth of d and a head-space d above the pocket.

The exterior face of the sheets, on the final product, may be printed and thus effectively divide the face into seven(7) sections across the face. These sections may represent the days of the week. The head-space above the pockets may also be printed so as to indicate the dates of a month.

It will be appreciated that although the present invention is represented as being assembled from three sheets of material such as paper, for example, more than three (3) sheets may be used, employing the principles set forth herein. When three (3) sheets are used, as illustrated in FIG. 3, five (5) pockets are obtained. If four (4) sheets are used to make an organizer, such as proposed in FIG. 4, an organizer having seven (7) lateral pockets is provided.

FIG. 4, for example illustrates in an exploded view four (4) sheets of material 41, 42, 43 and 44 folded at fold point 15 where by the upward folded sheet sections 41', 42', 43' and 44' combine with the main sections of the sheets to form seven (7) laterial pockets. As previously represented, adhesive stripes 51 through 57 are provided between adjacent sheet faces which adhesive stripe function to hold the sheet together while forming a bottom for the pockets made by the combination.

FIG. 4 represents a sheet of cut-out or tear-out stamps which may be used to identify TV presentations and when and on what channel such presentation will be broadcast or aired. Each stamp of the sheet of stamps may identify a TV presentation, such as a movie or TV series show or special TV presentation by name on one side of the stamp and may, on the other side indicate the channel, date and time on which the identified presentation will be broadcast. The individual stamps may be removed from the sheet 35 and the removed stamps, such as 36 and/or 37 may be stored in the month, dated pockets organizer thus forming a personalized TV program for the entire month. One or more stamps identifying TV presentations may be inserted into any dated pocket on which the identified TV presentation is to be aired. If, for some reason the person who generated the TV program is unavailable at a particular time to view a particular presentation the stamp identifying the particular presentation may be removed from the particular pocket and the schedule of airing set forth on the reverse side of the stamp may be interrogated and the stamp may be repositioned in another pocket for another date when the individual will be available to view the presentation.

It will be appreciated that the organizer invention and method of making the same is inexpensive and since the materials used are also inexpensive, the product of the invention is inexpensive and may be used as a disposable and/or giveaway organizer Thus there has been shown and described an inexpensive organizer that may be used for generating a personalized TV program which is readily changeable.

A preferred embodiment of the invention has been illustrated and described as an organizer having five (5) equidistant, spaced, lateral pockets. In addition an alternate embodiment has been represented and some modifications have been suggested. Other changes and modifications may be made, as will become apparent to those skilled in the art, without departing from the spirit of the invention.

What is claimed is:

1. An organizer for storing and retaining cards and/or stamps containing data thereon, said organizer comprising:
   (a) a plurality of sheets, each sheet having substantially the same width dimension, defined by opposite edges and having first and second ends, the length of each sheet being substantially the same and each length defined by respective first and second ends of the respective sheet;
   (b) each sheet of said plurality of sheets positioned with a face thereof adjacent a face of another sheet of said plurality;
   (c) said first ends of adjacent sheets being offset from each other a predetermined distance; and (d) said plurality of sheets folded at a common fold so that one sheet of said plurality is folded over itself face-to-face so that said first end of said one sheet is offset from said second end of said one sheet said predetermined distance for forming a plurality of pockets across the width of said sheet and defined by said first ends and said second ends.

2. An organizer for storing and retaining cards and/or stamps as in claim 1 and in which the number of said plurality of sheets is three and the number of said plurality of pockets is five.

3. An organizer as in claim 2 and in which each pocket of said plurality of pockets is virtually divided into seven sub-pockets and each sub-pocket represents a day of the week.

4. An organizer for storing and retaining cards and/or stamps as in claim 3 and in which the data contained on the cards and/or stamps identifies a television presentation, one television presentation on each card or stamp and said data includes the schedule of broadcasting for the television presentation so identified and said cards and/or stamps are insertable in a sub-pocket representing the day of the week the identified television presentation is to be broadcast.

5. An organizer for storing and retaining cards and/or stamps as in claim 1 and in which the number of said plurality of sheets is four and the number of said plurality of pockets is seven.

6. An organizer as in claim 5 and in which each pocket of said plurality of pockets is virtually divided into seven sub-pockets and each sub-pocket of the same pocket represents a day of the week.

7. An organizer for storing and retaining cards and/or stamps as in claim 1 and in which each sheet of said plurality of sheets further includes:
a stripe of adhesive material across the width thereof and located between faces of adjacent sheets, said stripe of adhesive material for adhering adjacent faces together for defining the depth of each pocket respectively of said plurality of pockets

* * * * *